(12) United States Patent
Mitchell, Jr.

(10) Patent No.: US 9,344,144 B1
(45) Date of Patent: May 17, 2016

(54) PASSIVE INTERMODULATION (PIM) COAXIL PROTECTION CIRCUIT

(71) Applicant: Sprint Communications Company L.P., Overland Park, KS (US)

(72) Inventor: Eugene S. Mitchell, Jr., Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 761 days.

(21) Appl. No.: 13/692,467

(22) Filed: Dec. 3, 2012

(51) Int. Cl.
*H04B 3/28* (2006.01)
*H04B 3/02* (2006.01)

(52) U.S. Cl.
CPC ........................ *H04B 3/02* (2013.01)

(58) Field of Classification Search
CPC ................... H01B 7/26; H04B 3/02

USPC ............................................. 307/89
See application file for complete search history.

(56) References Cited

U.S. PATENT DOCUMENTS

| | | | | |
|---|---|---|---|---|
| 5,742,258 A | * | 4/1998 | Kumpfbeck et al. | .. H01Q 1/246 343/700 MS |
| 5,966,102 A | * | 10/1999 | Runyon | ................ H01Q 1/246 343/797 |
| 8,998,640 B1 | * | 4/2015 | Mitchell, Jr. | ....... H01R 13/6215 439/578 |

\* cited by examiner

*Primary Examiner* — Stephen W Jackson

(57) ABSTRACT

A method and system for implementing a passive intermodulation (PIM) coaxial protection circuit is provided. An electrical circuit is created between a radio source, coaxial cable, and antenna to prevent passive intermodulation. The radio source or an external power supply provides direct current and voltage in the electrical circuit, causing the current and voltage to pass through any corrosion that might build up in the path, especially at connectors.

20 Claims, 4 Drawing Sheets

PASSIVE INTERMODULATION (PIM) COAXIL PROTECTION CIRCUIT

CROSS-REFERENCE TO RELATED APPLICATIONS

Not applicable.

BACKGROUND OF THE INVENTION

Today, the vast majority of all radio frequency (RF) network passive intermodulations (PIMs) are caused by RF connectors. With the aging process, the RF connectors become loose by expansion and contraction, due to environmental temperature changes. Small layers of corrosion build up between the male and female portions of the connectors, due to moisture and the lack of a "hard contact" required to prevent corrosion. As a result, PIMs cause networks providers to lose money in lost revenue because of the interference. The type of interference is usually the result of non-linear signals or harmonics that occur. Therefore, a solution is desired that would not only reduce PIM, but prevent PIM altogether.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a method and system for implementing a passive intermodulation (PIM) coaxial protection circuit. Accordingly, the present invention provides a PIM coaxial protection circuit across a coaxial cable connected to a radio and an antenna. The PIM coaxial protection circuit removes PIM.

A coaxial protection circuit uses a small direct current (DC) with forty-eight (48) volts DC between the RF shield and the center conductor of the RF coaxial cable. This circuit enables the current and voltage to "punch" through any small oxidation layer that starts to form, preventing PIMs from developing. A DC isolation transformer is used primarily on the antenna side of the coaxial cable to contain the direct current within the coaxial cable to prevent possible impact to the antenna radiation pattern.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention relate generally to a method and system for implementing a passive intermodulation (PIM) coaxial protection circuit. Accordingly, the present invention provides a PIM coaxial protection circuit across a coaxial cable connected to a radio and an antenna. The PIM coaxial protection circuit removes PIM.

Figure 1:
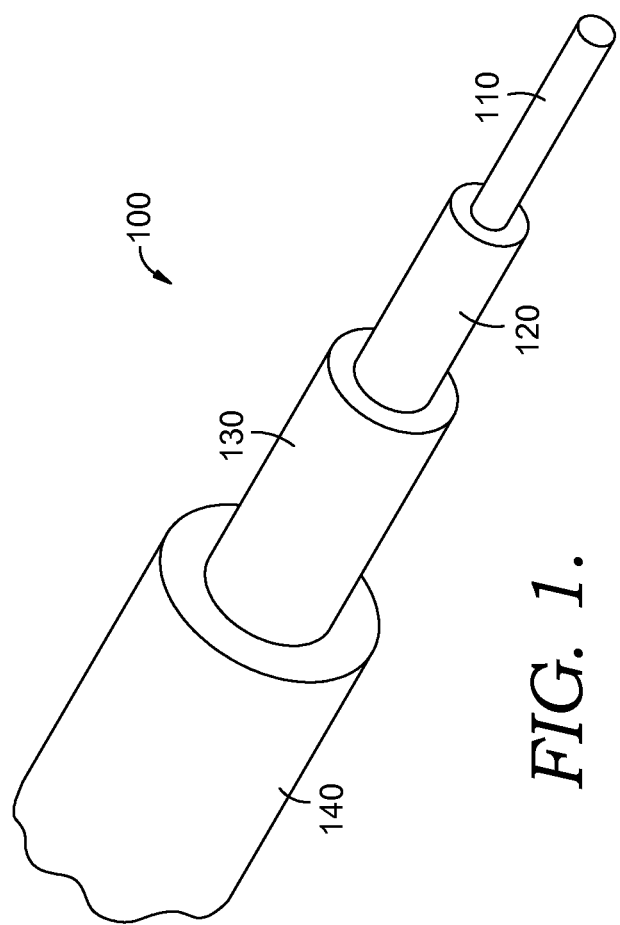
FIG. 1 is an exemplary view of a coaxial cable, implemented in accordance with an embodiment of the present invention.

In FIG. 1, an exemplary coaxial cable 100 is shown with a core 110, an insulator 120, a metallic shield 130, and a jacket 140. Cable 100 is typical of a coaxial cable that is used in various applications, including but not limited to, cable television, wireless telecommunications, and so forth. Cable 100 is shown with its components extended and exposed to provide a clear visualization. However, cable 100 is not used in the manner shown, but only provided for illustrative purposes. One of ordinary skill in the art understands how cable 100 is used. Core 110 is a metallic substance that extends down the middle of cable 100. Core 110 is typically copper or another metallic material that can conduct electricity and propagate signals. Insulator 120 is an exemplary dielectric insulator. The insulation in insulator 120 insures there will be low electrical conduction. Metallic shield 130 encloses insulator 120. Metallic shield 130 can be made of a variety of metals, such as copper or aluminum. In addition, metallic shield 130 may be implemented as a mesh or braided material. Metallic shield 130 is used to reduce electrical noise and electromagnetic radiation. Jacket 140 is an exemplary outer covering for cable 100. Jacket 140 can be made of plastic, rubber, or other material that provides a covering or protection to the internal components in cable 100. Jacket 140 also enables cable 100 to be used in various environments, including exposure to outside elements.

Figure 2:
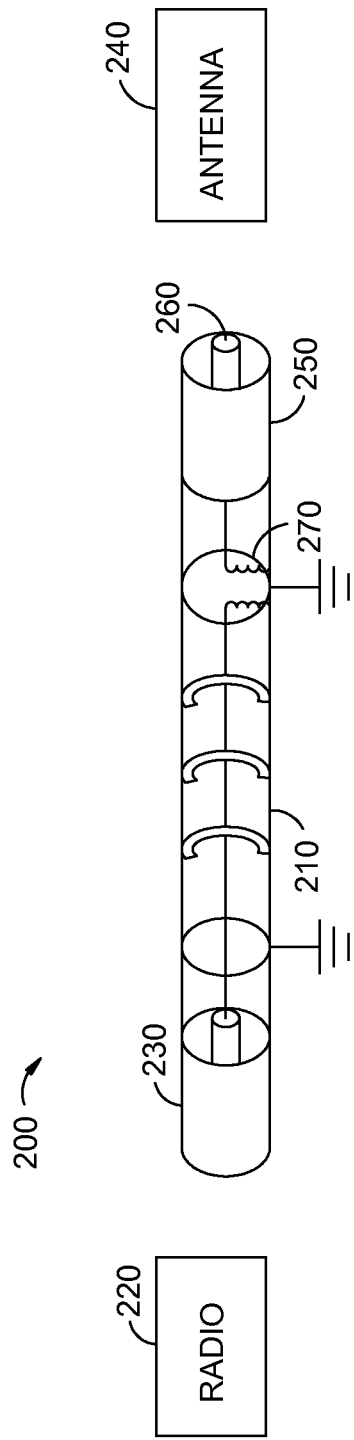
FIG. 2 is an exemplary view of a passive intermodulation coaxial protection circuit, implemented in accordance with an embodiment of the present invention.

Turning now to FIG. 2, a coaxial cable system 200 is shown with a coaxial cable 210, a radio source 220, and an antenna system 240. In an implementation of an embodiment of the present invention, coaxial cable 210, radio source 220, and antenna system 240 are connected together, although this is not directly shown. Cable 210 is similar to coaxial cable 100 shown in FIG. 1. Cable 210 includes a connector 230 that enables cable 210 to connect to radio source 220. Cable 210 also includes a connector 250 that enables cable 210 to connect to antenna system 240. Connectors 230 and 250 can be a Concelman (C)-connector, F-connector, Neill (N)-connector, Bayonet Neill-Concelman (BNC) connector, DIN connector, SubMiniature version A (SMA) connector, threaded Neill-Concelman (TNC) connector, Ultra High Frequency (UHF) connector, or other type of connector found in an operating environment where a radio frequency (RF) is used. The idea here is to not name all types of connectors that can be used to connect coaxial cable 210 to radio source 220 or antenna system 240, but to establish that various connectors can be used to accomplish the task of connecting devices together.

Radio source 220 can be a radio or multiple radios that broadcast various types of signals. Radio source 220 is capable of propagating an RF signal onto coaxial cable 210 through connector 230. Radio source 220 can also send a direct current and voltage onto coaxial cable 210. The direct current is sent onto the center core, also shown as core 110 in FIG. 1. As shown in FIG. 2, a core 260 extends down the center of coaxial cable 210 and can receive an RF signal, direct current, or both from radio source 220. The voltage that is delivered onto coaxial cable 210 is measured between metallic shield 130 and core 110. In an implementation of an embodiment of the present invention, the direct current is typically at least fifty (50) milliamps and the voltage is at least forty-eight (48) volts DC.

Antenna system 240 can be an antenna or multiple antennas that broadcast and receive signals. Antenna system 240 provides the interface for radio source 220 to send and receive information through coaxial cable 210. Similar to radio source 220, antenna system 240 connects to coaxial cable 210 at connector 250. Antenna system 240 is cable of receiving the RF signal propagated by radio source 220. Antenna system 240 is also capable of receiving the direct current sent by radio source 220. However, in an implementation of an embodiment of the present invention, coaxial cable 210 can have a direct current (DC) isolation transformer 270, which prohibits the direct current from reaching antenna system 240. DC isolation transformer 270 allows the direct current to stay within coaxial cable 210 but not reach antenna system 240. This implementation is desirable to prohibit any impact that the direct current might make on antenna system 240. For example, it is desirable not to have the direct current impact the antenna radiation pattern. In another implementation of an embodiment, DC isolation transformer 270 can be placed on the opposite side of connector 350 closer to or within antenna system 340. Although not shown in the figures, this implementation allows the direct current and voltage to travel at least through connector 350 where oxidation forms.

In an implementation of an embodiment of the present invention, coaxial cable system 200 operates in a wireless telecommunication environment. For example, a base station, base transceiver station, radio network controller, cell site, or similar system operates with exemplary devices such as radio source 220, cable 210, and antenna system 240 to reach subscribers or a mobile switching center. Typically, many cell sites operate in the field providing wireless coverage to offer wireless service to subscribers. In the field environment, connectors, such as connector 230 and 250, can become loose allowing corrosion to form where the contact is loose. Connectors become loose over time due to various factors, such as the vibration of equipment or the change in temperature causing materials to expand and contract. The development of corrosion or the loose connection can give rise to passive intermodulation. Further, passive intermodulation can occur within coaxial cable 210, resulting from damage or a break in the insulation within the cable, or resulting from a bent or warped core 110 or core 260. The corrosion occurs as a result of oxidation that occurs with the metal.

Implementations of embodiments of the present invention overcome passive intermodulation by providing direct current in the coaxial cable 210 along with voltage that can be measured between the metallic shield 130 and core 110 (core 260). The presence of the direct current and voltage enables a closed electrical circuit to be maintained between radio source 220, coaxial cable 210, and antenna system 240. By maintaining this electrical circuit, passive intermodulation is removed. As such, the electrical system along with the components of coaxial cable system 200 is called a passive intermodulation coaxial protection circuit.

Figure 3:
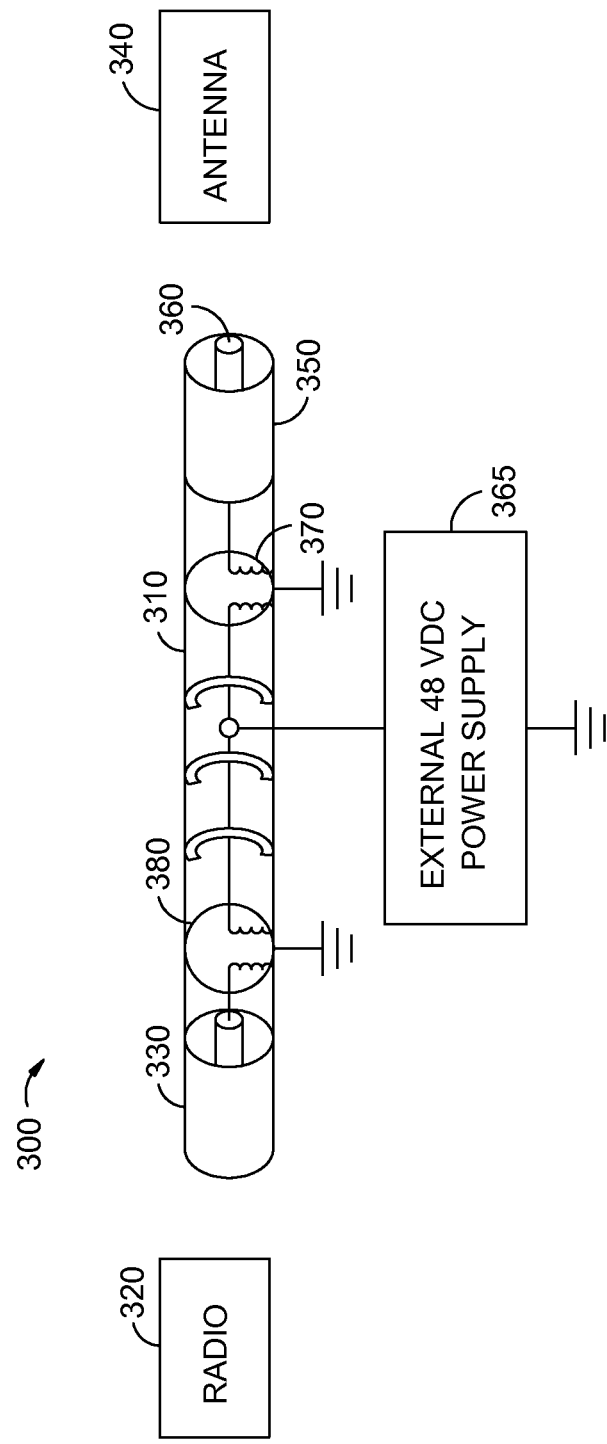
FIG. 3 is an exemplary view of a passive intermodulation coaxial protection circuit with an external power supply, implemented in accordance with an embodiment of the present invention.

Turning now to FIG. 3, a coaxial cable system 300, similar to coaxial cable system 200, is shown. Coaxial cable system 300 is shown with a coaxial cable 310, a radio source 320, an antenna system 340, and a power supply 365. In an implementation of an embodiment, coaxial cable system 300 performs the same function as coaxial cable system 200, acting as a passive intermodulation coaxial protection circuit to remove passive intermodulation. However, coaxial cable system 300 is different from system 200 by providing direct current and voltage with power supply 365 rather than radio source 320. Power supply 365 is external to coaxial cable 310, radio source 320, and antenna system 340. Power supply 365 can connect to the devices through a T-connection. In other words, connector 330 or 350 may take the shape of a T-connection (not shown) that allows connectivity of power supply 365 with coaxial cable 310 and radio source 330, or allows connectivity of power supply 365 with coaxial cable 310 and antenna system 340. In another implementation, power supply 365 may connect directly to coaxial cable 310 (shown) without impacting connectors 330 and 350.

Like FIGS. 1 and 2, core 360 is similar to cores 110 and 260. Core 360 is a metallic material that can receive electrical current as well as propagate RF signals.

Because power supply 365 provides current and voltage rather than radio source 320, coaxial cable 310 has two DC isolation transformers indicated by DC isolation transformers 370 and 380. Both DC isolation transformers prevent current from leaking or passing into radio source 320 and antenna system 340. In another implementation of an embodiment, DC isolation transformer 370 can be placed on the opposite side of connector 350 closer to or within antenna system 340. DC isolation transformer 380 can be placed on the opposite side of connector 330 closer to or within radio source 320. Although not shown in the figures, this implementation allows the direct current to travel and voltage at least through connectors 330 and 350 where oxidation forms.

Figure 4:
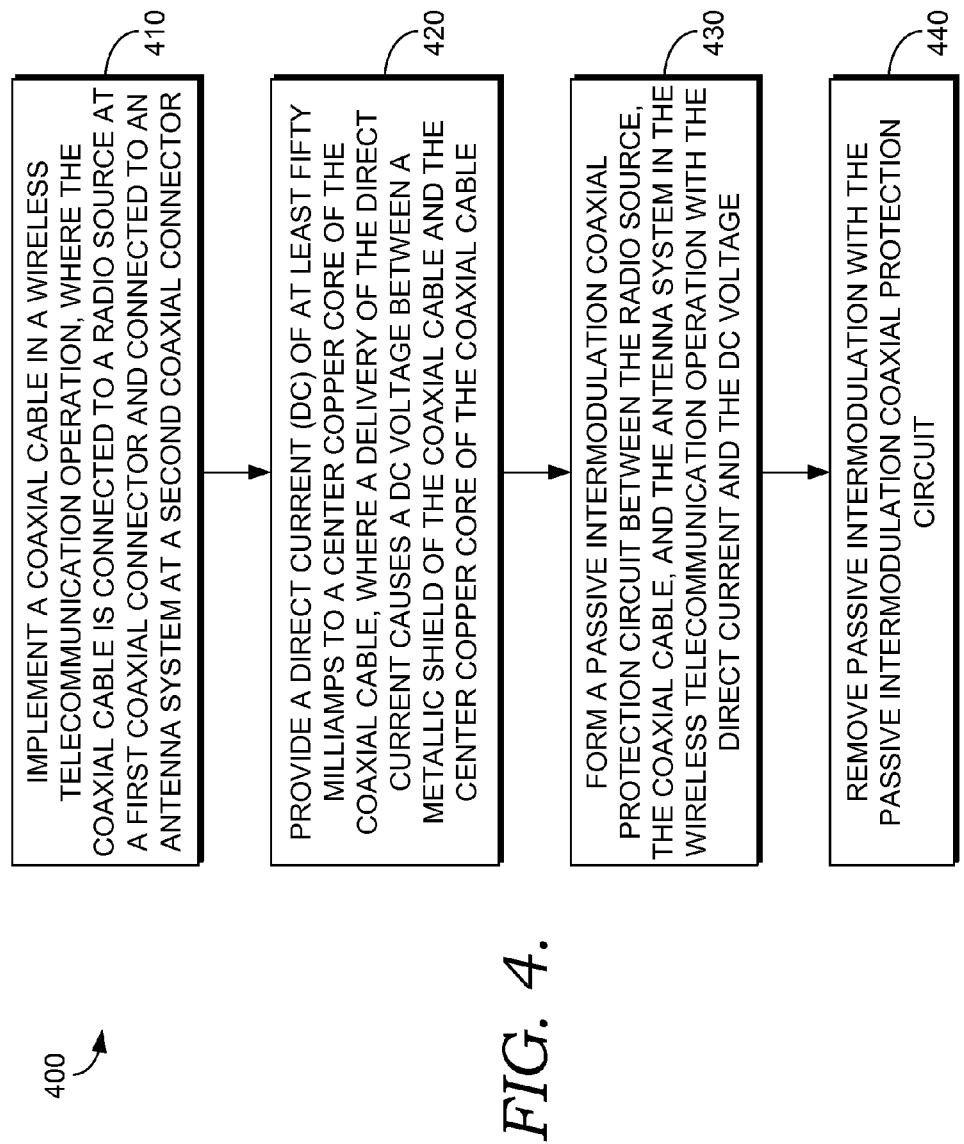
FIG. 4 is a process for implementing a passive intermodulation coaxial protection circuit, in accordance with an embodiment of the present invention.

In FIG. 4, a process for implementing a passive intermodulation coaxial protection circuit is provided in a method 400. In a step 410, coaxial cable 210 is implemented in a wireless telecommunication operation. Coaxial cable 210 is connected to radio source 220 at coaxial connector 230. Coaxial cable 210 is also connected to antenna system 240 at coaxial connector 250.

In a step 420, direct current of at least fifty (50) milliamps is provided to center copper core 260 (also core 110) of coaxial cable 210. The delivery of the direct current causes a DC voltage between metallic shield (also metallic shield 130) of coaxial cable 210 (also cable 100) and the center copper core 260 (also core 110) of coaxial cable 210.

A passive intermodulation coaxial protection circuit is formed between radio source 220, coaxial cable 210, and antenna system 240, in a step 430. The passive intermodulation coaxial protection circuit is formed in a wireless telecommunication operation with the direct current and DC voltage.

In a step 440, passive intermodulation is removed with the passive intermodulation protection circuit.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for implementing a passive intermodulation (PIM) coaxial protection circuit, comprising:
   implementing a coaxial cable in a wireless telecommunication operation, where the coaxial cable is connected to a radio source at a first coaxial connector and the coaxial cable is connected to an antenna system at a second coaxial connector;
   providing a direct current (DC) of at least fifty milliamps to a center core of the coaxial cable, where a delivery of the direct current causes a DC voltage between a metallic shield of the coaxial cable and the center core of the coaxial cable;

forming the PIM coaxial protection circuit between the radio source, the coaxial cable, and the antenna system in the wireless telecommunication operation with the direct current and the DC voltage; and removing PIM with the PIM coaxial protection circuit.

2. The method of claim 1, further comprising:

implementing a DC isolation transformer in a path of the coaxial cable in proximity to the antenna system and the second coaxial connector, whereby the DC isolation transformer contains the direct current within the coaxial cable and prevents an impact to the antenna system.

3. The method of claim 2, wherein providing the direct current comprises providing the direct current from the radio source.

4. The method of claim 3, wherein the DC voltage is at least forty-eight (48) volts DC (VDC).

5. The method of claim 2, wherein the coaxial cable includes the center core, a dielectric insulator, the metallic shield, and a sheath.

6. The method of claim 2, wherein providing the direct current comprises providing the direct current from an external power supply.

7. The method of claim 6, further comprising:

implementing another DC isolation transformer in the path of the coaxial cable in proximity to the radio source and the first coaxial connector, whereby the DC isolation transformer and the another DC isolation transformer contain the direct current within the coaxial cable and prevent the impact to the antenna system and the radio source.

8. The method of claim 7, wherein the DC voltage is at least forty-eight (48) volts DC (VDC).

9. The method of claim 8, wherein the coaxial cable includes the center core, a dielectric insulator, the metallic shield, and a sheath.

10. The method of claim 1, wherein removing PIM with the PIM coaxial protection circuit comprises pushing the direct current and the DC voltage through any oxidation layer that forms.

11. A system for a passive intermodulation (PIM) coaxial protection circuit in a wireless telecommunication environment, comprising:

a coaxial cable connected to a radio source at a first coaxial connector and connected to an antenna system at a second coaxial connector;

the radio source provides a direct current (DC) of a least fifty milliamps to a center core of the coaxial cable, where a delivery of the direct current causes a DC voltage between a metallic shield of the coaxial cable and the center core of the coaxial cable; and the radio source, the coaxial cable, and the antenna system form a closed electrical circuit with the direct current and the DC voltage, whereby the PIM is removed.

12. The system of claim 11, further comprising:

a DC isolation transformer operable in a path of the coaxial cable in proximity to the antenna system and the second coaxial connector, whereby the DC isolation transformer contains the direct current within the coaxial cable and prevents an impact to the antenna system.

13. The system of claim 12, wherein the DC voltage is at least forty-eight (48) volts DC.

14. The method of claim 13, wherein the coaxial cable includes the center core, a dielectric insulator, the metallic shield, and a sheath.

15. The system of claim 14, wherein the radio source, the coaxial cable, and the antenna system form a closed electrical circuit with the direct current and the DC voltage comprises the radio source, the coaxial cable, and the antenna system push the direct current and the DC voltage through any oxidation layer that forms.

16. A system for a passive intermodulation (PIM) coaxial protection circuit in a wireless telecommunication environment, comprising:

a coaxial cable connected to a radio source at a first coaxial connector and connected to an antenna system at a second coaxial connector, wherein the first coaxial connector or the second coaxial connector is a T-connector that allows connection to an additional device;

the coaxial cable connected to an external power supply at the T-connector;

the external power provides a direct current (DC) of a least fifty milliamps to a center core of the coaxial cable, where a delivery of the direct current causes a DC voltage between a metallic shield of the coaxial cable and the center copper core of the coaxial cable; and the radio source, the coaxial cable, the antenna system, and the external power supply form a closed electrical circuit with the direct current and the DC voltage, whereby the PIM is removed.

17. The system of claim 16, further comprising:

a DC isolation transformer operable in the coaxial cable in proximity to the antenna system at the second coaxial connector, whereby the DC isolation transformer contains the direct current within the coaxial cable and prevents an impact to the antenna system.

18. The system of claim 17, further comprising:

another DC isolation transformer in the coaxial cable in proximity to the radio source at the first coaxial connector, whereby the DC isolation transformer and the another DC isolation transformer contain the direct current within the coaxial cable and prevent the impact to the antenna system and the radio source.

19. The system of claim 18, wherein the DC voltage is at least forty-eight (48) volts DC.

20. The system of claim 19, wherein the radio source, the coaxial cable, and the antenna system form a closed electrical circuit with the direct current and the DC voltage comprises the radio source, the coaxial cable, and the antenna system push the direct current and the DC voltage through any oxidation layer that forms.

* * * * *